Aug. 28, 1945. W. J. SIX 2,383,893
PISTON EXPANDER
Filed March 10, 1944
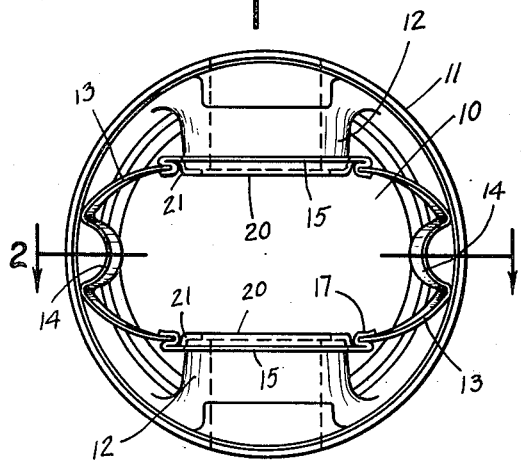
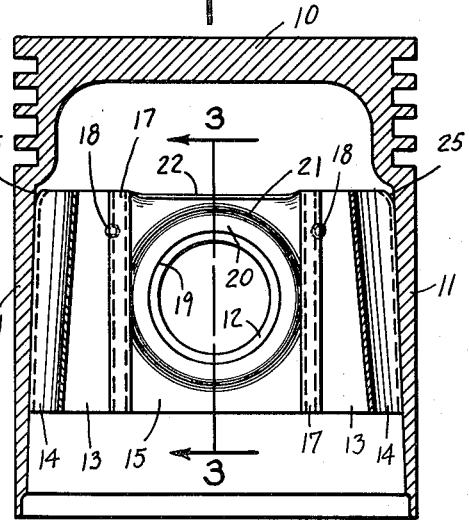
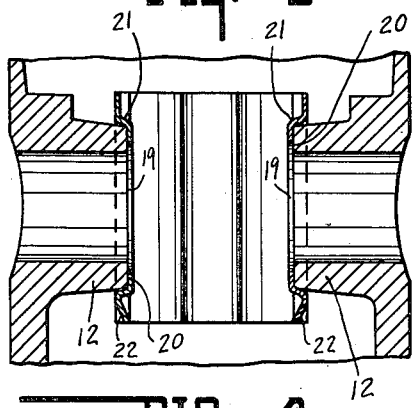
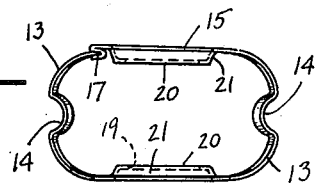
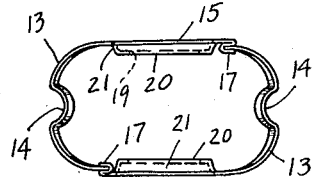
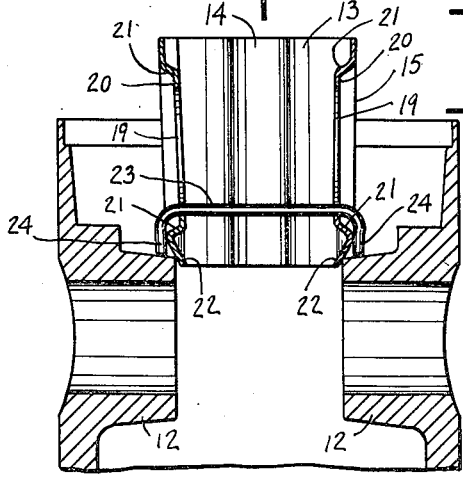
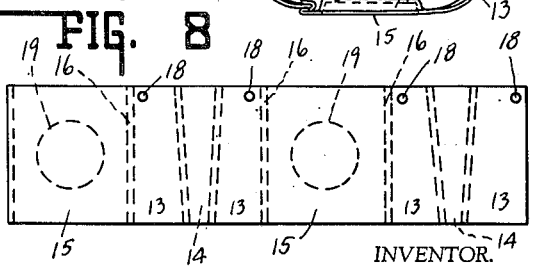
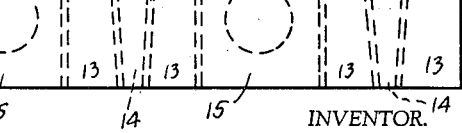
INVENTOR.
WALTER J. SIX
BY Lockwood, Goldsmith & Galt
ATTORNEYS.

Patented Aug. 28, 1945

2,383,893

UNITED STATES PATENT OFFICE 2,383,893

PISTON EXPANDER

Walter J. Six, Indianapolis, Ind.

Application March 10, 1944, Serial No. 525,920

13 Claims. (Cl. 309—12)

This invention relates to an expander for a piston skirt adapted for use in the cylinders of internal combustion engines, compression engines, steam engines and the like, and of a general character which completely encircles the interior of the skirt so as to exert its expanding force in all four cardinal directions.

By means of the character and structure of this expander, it has and maintains the advantages inherent in the complete encirclement of the interior of the piston skirt, while being so formed and constructed as to be economical in production, simple in installation and positive and accurate in its expanding action.

One feature of the invention resides in the formation of a tapered expansion fold at opposed end portions of the expander which permits the expander to be formed with the desired taper for installation and conformity to the internal taper of the piston skirt. By reason of the tapered expansion fold, the entire expander may be formed from one rectangular piece of sheet material without waste. Being rectangular in its unfabricated condition, the desired taper is provided therein when formed by a corresponding tapering of the expansion fold. At the same time such tapering of the expansion fold tends to vary the expanding pressure exerted in corresponding relation to the thickness of the piston skirt. It also permits shifting of the pressure exerted to different portions of the piston by control of the depth of the fold, such that greater pressure may be obtained towards the piston head or towards the bottom of the skirt, if desired, by changing the angularity of the fold. Further, by reason of such tapering or angularity of the fold, joined ends of the formed sheet material are maintained parallel to the axis and to each other.

Another feature of the invention resides in the provision of opposed apertures through which the piston wrist pin may extend, said apertures being provided with a flanged seat to provide a recessed seating portion adapted to engage the bosses of the piston and thereby provide a centering and locking seat which prevents shifting, as well as non-interference with the pin.

Another feature of the invention resides in the structure of this type of expander wherein it is unitary, formed of one strip of sheet metal with its free ends permanently locked together, or where desired formed of a plurality of sections to sheet metal similarly locked together as a unit.

A further feature resides in the provision of an inwardly tapering lip on the entering edge of the boss-engaging portion of the expander to guide it over the inner faces of the bosses of the piston to permit the expander to be radially forced thereover, the opposed ends of the entering edge of the expander being beveled inwardly to permit sliding contact with the inner wall of the piston skirt to prevent gouging and facilitate its installation.

The full nature of the invention will be understood from the accompanying drawing and the following description and claims:

Fig. 1 is a bottom plan view of a piston showing the expander mounted therein. Fig. 2 is a section taken on the line 2—2 of Fig. 1. Fig. 3 is a section taken on the line 3—3 of Fig. 2. Fig. 4 is the same as Fig. 3 showing relative positions of the expander and piston at the beginning of its installation. Fig. 5 is a diagrammatic illustration of a one piece expander. Fig. 6 is the same as Fig. 5 showing one form of a two piece expander. Fig. 7 is the same as Fig. 5 showing a modified form of two piece expander. Fig. 8 is an illustration of the unfabricated structure of which the expander is formed.

In the drawing there is illustrated a piston having a head 10 and skirt 11 with inwardly extending piston bosses 12 through which the usual wrist pin is adapted to extend.

The piston expander is formed from an unfabricated strip of sheet metal, as shown in Fig. 8, and may be in one or two pieces, as shown in Figs. 5, 6 and 7, respectively, or in four pieces, as shown in Figs. 1 and 2. In any case, the formed expander is unitary so that in handling an installation only a unitary structure is involved.

In general the expander is provided with end sections 13 formed with expansion folds 14. Between the end sections there are provided the side sections 15. The end sections 13 with the extension folds 14 are adapted to engage the inner surface of the piston skirt intermediate the bosses, the side sections being adapted to embrace the side portions of the bosses. Thus, it may be said in general that the expander is substantially oval in shape and normally of slightly greater dimensions than the interior surface of the piston skirt to be engaged thereby. Thus, when the expander is forced into the skirt, it is compressed at the expansion folds so that it is under tension to continuously exert an outward pressure in all four cardinal directions, that is, axially of the bosses and transversely thereof.

As illustrated in Fig. 8, the expander comprises a single rectangular strip of sheet metal. Wherein the unitary expander is of four pieces secured together, it may be cut as indicated at 16 to provide the interlocking folds 17. Thus, the four piece unitary expander of Figs. 1 and 2 may be formed by providing each of the side sections 15 with the interlocking fold into which the end edges of the end sections 13 may be crimped and locked by forming a hole indicated at 18 therein into which the metal of the fold 17 may be forced.

Each of the side sections 15 is provided with an aperture 19 of a slightly larger diameter than the opening through the bosses 12 of the piston. Surrounding the aperture there is an inwardly flanged seat 20 surrounded by the shoulder 21. Said flanged seat is formed to engage the bosses which nest within the annular shoulder portion 21 thereof. Thus, having been installed in the skirt the expander is centered and locked therein through such seating engagement with the piston bosses.

Inasmuch as the expander is unitary and is mounted over the piston bosses, it is installed by compressing it and hammering it into said centering and locking engagement, the initial position thereof being illustrated in Fig. 4 and the final position being illustrated in Fig. 3. To facilitate installation, the lower or entering edges of the side sections immediately adjacent the shoulder 21 are bent inwardly to provide an inclined lip portion 22 so that the entering free edge thereof may extend inwardly of the faces of the bosses to provide a sliding contact between this lip portion and the edges of the bosses. Thus, the lip portion tends to contract the side sections until they pass over the bosses to center and lock thereon. This arrangement may be facilitated by providing a removable draw pin 23, shown in Fig. 4, said draw pin having inturned locking ends 24 engageable over the exterior of the lip portions for drawing the side sections inwardly as they are introduced between the faces of the bosses. However, the ends 24 of the pin are adapted to engage the upper surface of the bosses as the expander is forced therebetween so that after it has entered far enough, it will be released from the draw pin which will then be free to drop out of the structure, permitting the final positioning of the expander in place.

Similarly, it is desirable that as the expander is forced into the piston, the protruding edges of the expansion folds be inwardly turned as indicated at 25 in Fig. 2, or filed or beveled off at these points to permit of a sliding action and prevent gouging.

As indicated in Figs. 1 and 2, the expander, although being formed from a rectangular sheet of material and thereby eliminating waste, is tapered to conform to the inner and upwardly tapering wall of the piston skirt. This is accomplished without affecting any tapering of the joints 17 by compensating therefor in the expansion fold. Thus, as best shown in Fig. 2, the depth of the expansion fold 14 is greater at the smaller end of the expander than at the larger. This has the further effect and advantage of increasing the spring tension at the upper portion of the piston where the wall is thicker, with the resultant effect that the expansion of the piston skirt by the expander is substantially uniform throughout its length.

It is to be understood that the expander when in its unconfined state, is of the general taper of the inner surface of the piston skirt and is also of greater overall dimensions so that upon being installed it will be compressed primarily through the action of its expansion folds to thereupon exert pressure outwardly, both axially of the bosses and transversely thereof or in all four cardinal directions under spring tension.

The invention claimed is:

1. A piston expander adapted to be installed within a piston skirt having inwardly extending wrist pin bosses, said expander being generally oval to embody opposed side sections engageable with the opposed bosses, end sections engageable with the skirt intermediate said bosses, and inwardly extending expansion folds formed in said end sections tapered from a greater depth of fold at the smaller end of the expander to a lesser depth at the larger end thereof.

2. A piston expander adapted to be installed within a piston skirt having inwardly extending wrist pin bosses, said expander being generally oval to embody opposed side sections engageable with the opposed bosses, end sections engageable with the skirt intermediate said bosses, and inwardly tapered expansion folds formed on said end sections of greater depth of fold at the smaller end of the expander than at the larger end thereof.

3. A piston expander adapted to be installed within a piston skirt having inwardly extending wrist pin bosses, said expander being generally oval to embody opposed side sections engageable with the opposed bosses, end sections engageable with the skirt intermediate said bosses, and inwardly extending folds formed in said end sections to a greater depth at the smaller end of the expander than the larger end thereof.

4. A piston expander adapted to be installed within a piston skirt having inwardly extending wrist pin bosses, said expander being generally oval to embody opposed side sections engageable with the opposed bosses, end sections engageable with the skirt intermediate said bosses, and inwardly extending folds formed in said end sections to a greater depth at the smaller end of the expander than the larger end thereof, said sections being rectangular before forming said expansion folds, the taper of said folds effecting a corresponding taper of said expander whereby it is of greater over-all dimensions at one end than the other.

5. A piston expander adapted to be installed within a piston skirt having inwardly extending wrist pin bosses, said expander being generally oval to embody opposed side sections engageable with the opposed bosses, end sections engageable with the skirt intermediate said bosses, said side sections being apertured to receive the wrist pin therethrough, and a flanged centering and locking seat formed therein surrounding said apertures respectively to engage and bear against the respective bosses and interlock therewith.

6. A piston pin expander adapted to be installed within a piston skirt having inwardly extending wrist pin bosses, said expander being generally oval to embody opposed side sections engageable with the opposed bosses, end sections engageable with the skirt intermediate said bosses, inwardly extending expansion folds formed in said end sections, said side sections being apertured to receive the wrist pin therethrough, and a flanged centering and locking seat formed therein surrounding said apertures respectively to engage and bear against the respective bosses and interlock therewith.

7. A piston expander adapted to be installed within a tapered piston skirt having inwardly extending wrist pin bosses, said expander being generally oval to embody opposed side sections engageable with the opposed bosses, end sections engageable with the skirt intermediate said bosses, inwardly extending folds formed in said end sections to a greater depth at one end than the other in conformity with the taper of said skirt, said side sections being apertured to receive the wrist pin therethrough, and a flanged centering and locking seat formed therein surrounding said apertures respectively to engage and bear against the respective bosses and interlock therewith.

8. A piston expander adapted to be installed within a piston skirt having inwardly extending wrist pin bosses, said expander being generally oval to embody opposed side sections engageable with the opposed bosses, end sections engageable with the skirt intermediate said bosses, inwardly extending folds formed in said end sections tapering to a greater depth at one end than the other, said sections being rectangular before forming said expansion folds, the taper of said folds effecting a corresponding reverse taper of said expander whereby it is of greater over-all dimensions at one end than the other, said side sections being apertured to receive the wrist pin therethrough, and a flanged centering and locking seat formed therein surrounding said apertures respectively to engage and bear against the respective bosses and interlock therewith.

9. A piston expander adapted to be installed within a piston skirt having inwardly extending wrist pin bosses, said expander being generally oval to embody opposed side sections engageable with the opposed bosses, end sections engageable with the skirt intermediate said bosses, inwardly extending expansion folds formed in said end sections, and inwardly sloping lips formed along the lower edges of said side sections respectively for wedging engagement with said bosses to direct said side sections therebetween into interlocking engagement therewith.

10. A piston expander adapted to be installed within a piston skirt having inwardly extending wrist pin bosses, said expander being generally oval to embody opposed side sections engageable with the opposed bosses, end sections engageable with the skirt intermediate said bosses, said side sections being apertured to receive the wrist pin therethrough, a flanged centering and locking seat formed therein surrounding said apertures respectively to engage and bear against the respective bosses and interlock therewith, and inwardly sloping lips formed along the lower edges of said side sections respectively for wedging engagement with said bosses to direct said side sections therebetween into interlocking engagement therewith.

11. A piston expander adapted to be installed within a piston skirt having inwardly extending wrist pin bosses, said expander being generally oval to embody opposed side sections engageable with the opposed bosses, end sections engageable with the skirt intermediate said bosses, inwardly extending expansion folds formed in said end sections, and beveled faces formed on the entering edges of said expansion folds for sliding engagement with the inner surface of the piston skirt.

12. A piston expander adapted to be installed within a piston skirt having inwardly extending wrist pin bosses, said expander being generally oval to embody opposed side sections engageable with the opposed bosses, end sections engageable with the skirt intermediate said bosses, said side sections being apertured to receive the wrist pin therethrough, a flanged centering and locking seat formed therein surrounding said apertures respectively to engage and bear against the inner face of the respective bosses and interlock therewith, inwardly sloping lips formed along the lower edges of said side sections respectively for wedging engagement with said bosses to direct said side sections therebetween into interlocking engagement therewith, and beveled faces formed on the entering edges of said end sections for sliding engagement with the inner surface of the piston skirt.

13. A piston expander adapted to be installed within a piston skirt having inwardly extending wrist pin bosses, said expander being generally oval to embody opposed side sections engageable with the opposed bosses, end sections engageable with the skirt intermediate said bosses, and inwardly sloping lips formed along the lower edges of said side sections respectively for wedging engagement with said bosses to direct said side sections therebetween into interlocking engagement therewith.

WALTER J. SIX.